GEORGE W. SCHULZ
INVENTOR

June 22, 1965    G. W. SCHULZ    3,190,421
FLUID CLUTCH WITH CUSHIONED ENGAGEMENT
Filed May 17, 1963    2 Sheets-Sheet 2

GEORGE W. SCHULZ
INVENTOR,

BY
ATTORNEY 3,190,421
FLUID CLUTCH WITH CUSHIONED
ENGAGEMENT
George W. Schulz, Dearborn, Mich., assignor to Ford Motor Company, Dearborn, Mich., a corporation of Delaware
Filed May 17, 1963, Ser. No. 281,136
4 Claims. (Cl. 192—85)

My invention relates generally to fluid pressure operated friction torque establishing devices, and more particularly to improvements in fluid pressure operated clutches that are adapted especially for use in an automatic multiple speed ratio power transmission mechanism.

The improved clutch structure of my invention is adapted especially for use in controlling the relative motion of elements of a planetary gear unit in an automatic power transmission mechanism. One element of the mechanism may be connected to one portion of the clutch structure and another element thereof may be connected to a second portion.

One member of the clutch structure defines an annular cylinder within which is slidably positioned an annular piston. Friction discs are carried by driving and driven clutch portions. When fluid pressure is admitted to the annular cylinder, the clutch discs are brought into frictional clutching engagement thereby locking together torque delivery elements of the gear mechanism to accomplish a speed ratio change. If the magnitude of the torque being delivered to the clutch structure is of a reduced value, it is necessary to reduce correspondingly the magnitude of the clutch pressure to establish smoothness in the clutch engagement. This normally requires the use of accumulator chambers or complex torque sensitive timing valve systems in an automatic control valve circuit.

It is an object of my invention to provide a cushioning action in the clutch application without the necessity of employing clutch applying control valve elements for this purpose.

It is another object of my invention to provide a fluid pressure operated clutch having a compound working chamber wherein a pressure buildup will occur sequentially in each of two pressure regions to provide an initial fast take-up motion and a delayed application of full clutch pressure.

It is a further object of my invention to provide an improved clutch that utilizes conventional clutch components so that a minimum amount of modification is required to adapt conventional transmission clutch structures to incorporate the improvements of my invention.

For the purpose of describing a preferred embodiment of my invention, reference will be made to the accompanying drawings, wherein.

Figure 1:
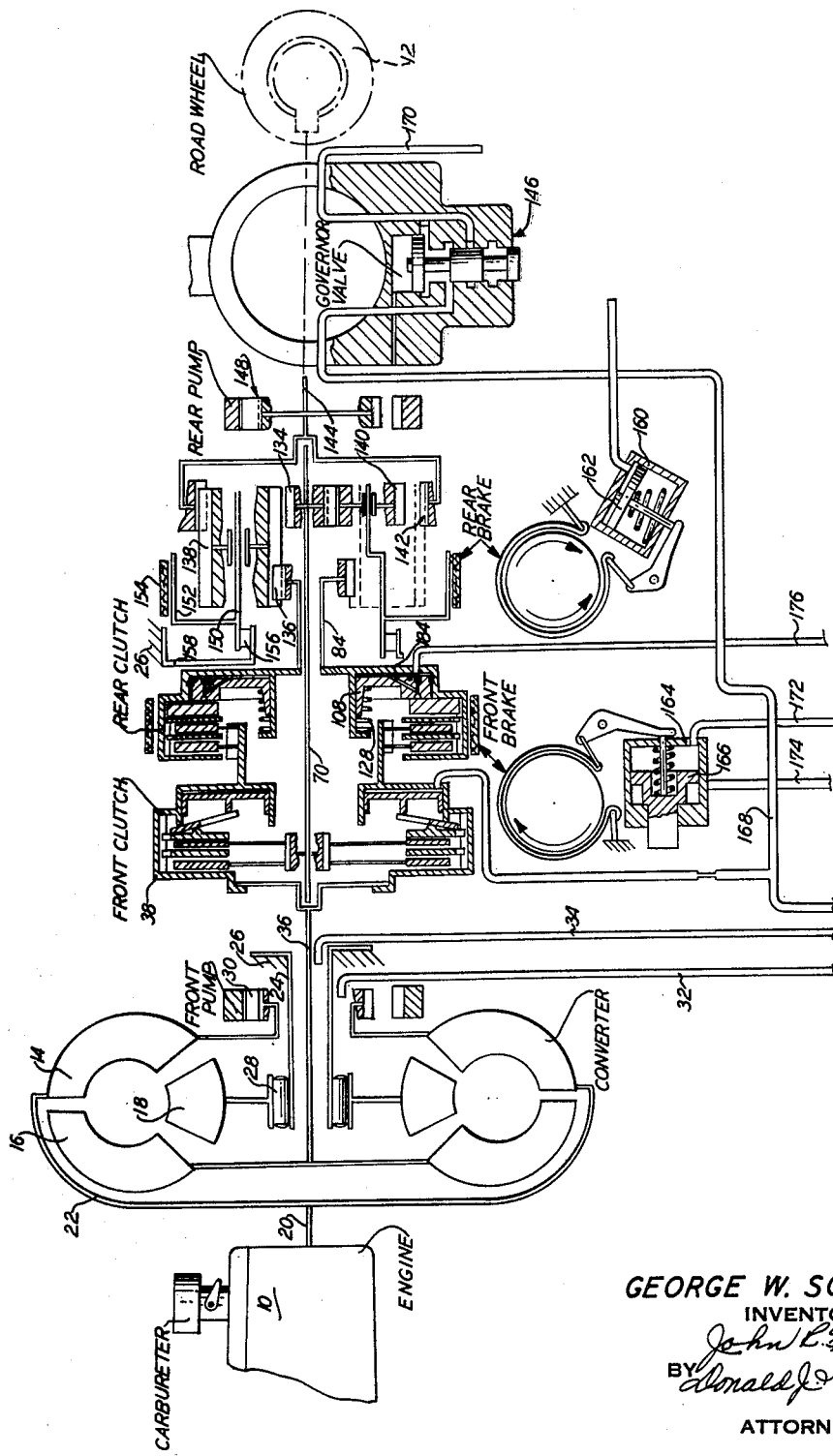
FIGURE 1 shows a schematic representation of a multiple speed ratio power transmission mechanism that may incorporate my improved clutch structure.

Referring first to FIGURE 1, the numeral 10 designates generally an internal combustion engine for a wheeled vehicle. It supplies power to the transmission mechanism which in turn forms in part a torque delivery path to the road wheels, one of which is schematically designated by reference character 12.

The transmission mechanism comprises a hydrokinetic torque converter having a bladed impeller 14, a bladed turbine 16 and a bladed stator 18. The impeller, turbine and stator are situated in toroidal fluid flow relationship in the usual fashion with the stator 18 situated between the turbine exit region and the impeller entrance region.

The impeller 14 is drivably connected to an engine crankshaft 20 through a suitable drive shell 22.

The stator 18 may be mounted upon a relatively stationary sleeve shaft 24 which is connected in a fixed fashion to a transmission housing shown in part at 26.

An overrunning brake assembly 28 is employed for establishing a one-way connection between the stator 18 and sleeve shaft 24.

The impeller 14 can be coupled drivably to a driving rotor of a positive displacement fluid pump 30 which forms a fluid pressure source for an automatic control valve circuit shown only in part in FIGURE 1. Fluid pressure is distributed to the control circuit from the pump 30 through a high pressure conduit 32. A low pressure return passage 34 communicates with the fluid intake region of the pump 30.

Figure 2:
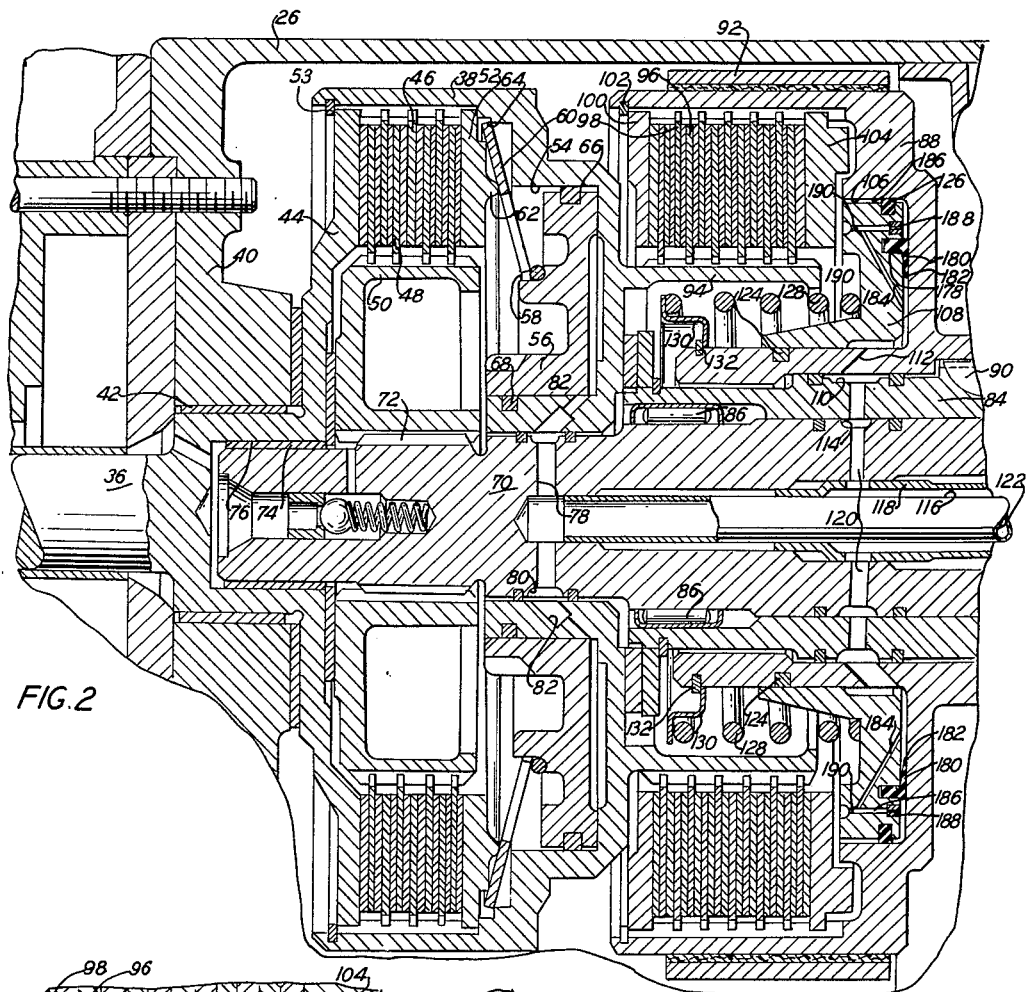
FIGURE 2 is a cross sectional view of the clutch arrangement used in the transmission of FIGURE 1.
Figure 3:
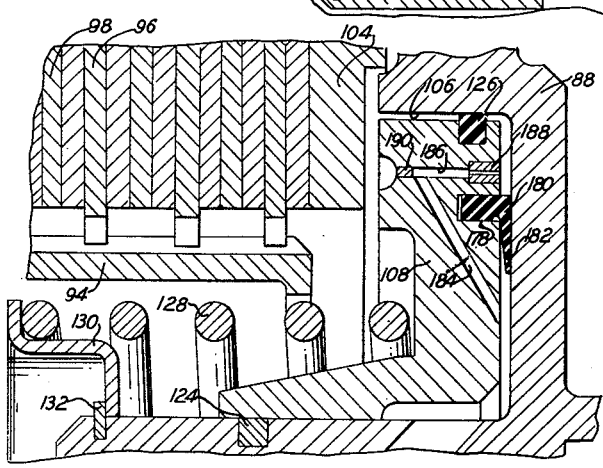
FIGURE 3 is an enlarged view of a portion of the rear portion of the clutch arrangement of FIGURE 2.

The turbine 16 is drivably connected to a turbine shaft 36 which in turn is connected to an outer clutch drum 38. This clutch structure is shown particularly in FIGURE 2.

The housing 26 includes a wall 40 having a bearing opening 42 which receives a bushing that journals the shaft 36. Shaft 36 is connected to drum 38 by means of a clutch plate 44 which is splined to drum 38 at its periphery.

Externally splined clutch discs 46 are carried by an internally splined portion of drum 38. They are situated in interdigital relationship with respect to internally splined clutch discs 48 which in turn are carried by an externally splined clutch member 50. A pressure plate 52 is splined to the drum 38 and is adapted to urge the clutch discs into frictional driving relationship with the plate 44 functioning as a reaction member. This plate 44 is held axially fast by a snap ring 53.

Drum 38 is formed with an annular cylinder 54 within which is positioned slidably an annular piston 56. This piston engages the inner periphery 58 of a Belleville spring washer 60. An intermediate portion of the washer 60 engages the pressure plate 52, a suitable reaction shoulder 62 being provided for this purpose. The washer 60 is anchored at its outer periphery against a shoulder 64 formed in the drum 38.

A first sealing ring 66 is carried by the piston 56 and a second sealing ring is carried by the inner periphery of the cylinder 54. It is mounted, as shown at 68, in the hub of the drum 38.

Drum 38 is journalled upon an intermediate shaft 70. This shaft is splined at 72 to the clutch element 50. It is journalled by means of a bushing 74 within a pilot opening 76 formed in the shaft 36.

Shaft 70 is formed with a radial pressure supply passage 78 which communicates with an annular groove 80. This groove 80 communicates with a radial passage 82 formed in drum 38. Passage 82 in turn communicates with the annular chamber defined by the cylinder 54 and piston 56.

Journalled upon shaft 72 is a sun gear sleeve shaft 84. A needle bearing 86 can be provided for this purpose. A brake drum 88 is keyed by means of the key 90 to the shaft 84. Disposed about the periphery of the drum 88 is a brake band 92 which is adapted to anchor the brake drum 88 when it is applied.

An extension 94 is formed on clutch drum 38. It is externally splined to establish a driving connection with internally splined discs 96 of a multiple disc clutch assembly. Externally splined discs 98 of the disc clutch assembly are drivably connected to an internally splined portion of the drum 88. A reaction plate 100 is carried by the drum 88 as indicated, and is held axially fast by a snap ring 102.

A pressure plate 104 also is splined to the interior of the drum 88 and is adapted to urge discs 96 and 98 into frictional driving relationship.

Drum 88 is formed with an annular cylinder 106 within which is received an annular piston 108. The annular cylinder and the piston cooperate to define a pressure chamber which communicates with an annular groove 110 formed in sleeve shaft 84 through a pressure supply passage 112. Groove 110 in turn communicates with an annular groove 114 formed in shaft 72. This groove 114 communicates with an annular passage 116 that is defined in part by a tubular insert 118 situated within an axial bore in the shaft 72. Passage 116 communicates with groove 114 through radial passages 120. Insert 118 surrounds another insert 122 through which fluid is distributed to the radial passage 78.

The hub of drum 88 is formed with a sealing ring 124. Another sealing ring 126 is carried by the outer periphery of piston 108.

A piston return spring 128 urges the piston 108 in a right hand direction. It is seated upon a spring seat 130 which is secured by means of a snap ring 132 to the extended hub of drum 88.

Referring again to FIGURE 1, it will be seen that the shaft 70 is connected to a first sun gear 134 and that the sleeve shaft 84 is connected to a second sun gear 136, the diameter of the latter being greater than the diameter of the former. Sun gear 136 drivably engages long planet pinions 138 which in turn drivably engage a set of short planet pinions 140. Pinions 140 in turn engage a ring gear 142 which is connected drivably to the driven shaft 144. This shaft carries a governor generally identified by reference character 146 which forms a part of an automatic control valve circuit. A rear pump which may form also a part of this circuit is connected drivably to the shaft 144 as shown at 148.

Pinions 138 and 140 are carried by a common carrier 150. A brake drum 152 is connected to the carrier 140 and is surrounded by brake band 154. An overrunning brake 156 is provided for transferring the reaction torque upon the carrier 150 to a stationary wall 158 that is connected to the transmission housing 26 as indicated. Overrunning brake 156 will permit rotation of the carrier 150 in one direction but will inhibit rotation in the opposite direction.

Brake band 154 can be applied by means of a fluid pressure operated servo that includes a cylinder 160 and a cooperating piston 162. Fluid pressure can be supplied by the valve circuit to the working chamber defined by the cylinder 160 and piston 162. In a similar fashion, brake band 92 can be applied by means of a servo that includes a cylinder 164 and a cooperating piston 166. This cylinder and piston define opposed fluid pressure chambers on either side of the piston 166. When both of these chambers are pressurized, the servos will assume a released condition. When the pressure chamber on the right hand side of the piston 166 is exhausted, however, the brake drum will assume an applied condition. As in the case of the rear servo, the front servo is supplied with fluid pressure selectively by an automatic control valve system.

A portion of the control valve system includes the conduit 168 that supplies pressure to the front clutch and to the governor 146. Governor 146 modulates the pressure supplied by the passage 168 and establishes a speed sensitive pressure signal in passage 170 that is used by the automatic control valve system.

Pressure is supplied to each of the working chambers of the front servo through pressure passages 172 and 174. Distribution of pressure to these passages is controlled by a shift valve, not shown. The same shift valve also controls pressure distribution to a passage 176 that extends to the rear clutch working chamber.

To establish low speed ratio operation, it is merely necessary to engage the front clutch. Turbine torque is then delivered directly to the sun gear 134. The planetary gears multiply the turbine torque and distribute the multiplied torque to driven shaft 144. The torque reaction of the gear unit is distributed to the casing through the overrunning coupling 156.

If manual speed or coasting operation is desired, it is then merely necessary to engage the brake 156. This then distributes the torque reaction, which is neegative in sense, to the transmission housing.

Intermediate speed operation is obtained by engaging the front brake, which anchors the sun gear 136. The overrunning brake 156 then will freewheel and the ring gear 142 will be driven at an increased speed ratio.

An upshift to the high speed ratio is obtained by releasing the front brake and applying in synchronism the rear clutch. This locks together the sun gears so that the gear elements rotate in unison with a one-to-one speed ratio.

The rear clutch piston 108 has formed therein an annular recess 178 within which is situated a flexible seal 180. This seal includes a lip 182 that engages the rear wall of the cylinder 106. The seal 180 thus divides the clutch pressure chamber into two regions, a radially inward region and a radially outward region. The first passage 184 extends generally in a radially outward direction through the piston 108 and communicates with a passage 186 that extends in a generally axial direction. These passages 184 and 186 form a bypass around the seal 180.

Disposed within passage 186 is an insert 188 which is formed with an orifice that establishes a fluid restriction. The flow capacity of the passages of which the insert 188 forms a part is substantially less than the capacity of the fluid inlet passage for the radially inward region of the clutch cylinder. Under these conditions, the radially inward region of the clutch cylinder will fill rather quickly when clutch pressure is distributed through passage 176. This will establish a quick slack take-up motion of the piston 108. Following this initial motion of the piston, pressure will develop in the radially outward region of the clutch cylinder. The clutch capacity then will increase correspondingly. The net result of this action is a cushioning in the clutch application.

I contemplate that the total piston travel in an installation of this type may be approximately .003 to .0001 inch. This degree of travel can be accommodated readily by the inherent resiliency of the lip 182 of the seal 180. The piston may move with this degree of travel without interrupting the sealing action of the seal 180.

The end of passage 186 may be closed by a plug 190.

Having thus described a preferred embodiment of my invention, what I claim and desire to secure by United States Letters Patent is:

1. A fluid clutch comprising a driving clutch member, a driven clutch member, one of the said members defining a fluid pressure cylinder, a first friction element carried by one clutch member, a second friction element carried by the other clutch member, an annular piston disposed within said cylinder, a fluid pressure seal carried by said piston including a portion situated in static sealing engagement with the adjacent walls of said cylinder during relative movement of said piston and cylinder whereby said piston and cylinder define a pair of radially spaced fluid pressure chambers, and means for establishing restricted fluid communicating between said chambers.

2. A fluid pressure operated clutch comprising a first and second clutch member, friction elements carried by each clutch member, a servo having an annular cylinder member formed in one of said clutch members and an annular piston member disposed in said cylinder member and adapted to urge said friction elements into clutching engagement, one member of said servo carrying a fluid seal with a flexible annular portion, said flexible seal portion being urged under the influence of fluid pressure in said servo into static sealing engagement with an adjacent portion of the other servo member during relative movement of said piston and cylinder members whereby said piston and cylinder members cooperate to define radially spaced pressure regions, a fluid pressure supply passage communicating with one of said regions, and a restricted fluid flow passage interconnecting said regions to bypass said seal.

3. A fluid pressure operated friction torque establishing device comprising a first and second member, friction elements carried by each member, a servo having an annular cylinder member formed in one of said members, an annular piston member disposed in said cylinder member and adapted to urge said friction elements into frictional engagement, one member of said servo carrying a fluid seal with an annular, flexible lip portion thereof disposed in static, sealing engagement with an adjacent portion of the other servo member during relative movement of said piston and cylinder members whereby said piston and cylinder members cooperate to define radially spaced pressure regions, a fluid pressure supply passage communicating with the radially inward region, and a restricted fluid flow passage interconnecting said regions to bypass said seal, the fluid flow capacity of said supply passage being greater than the fluid flow capacity of said restricted passage.

4. A fluid pressure operated friction torque establishing device comprising an annular cylinder, an annular piston disposed in said cylinder, driving and driven elements, each element having a friction member carried thereon, said piston being adapted to urge said friction members into frictional engagement, an annular groove formed in said piston, a fluid seal situated in said groove and including a flexible lip extending radially inwardly, said lip being disposed in static sealing engagement with a radially disposed annular surface in said cylinder during relative movement of said piston and said cylinder thereby dividing said annular cylinder into semi-isolated, radially inward and radially outward regions, a fluid flow restricting passage in said piston bypassing said seal, and a feed passage communicating with the radially inward region of said annular cylinder.

References Cited by the Examiner

UNITED STATES PATENTS

| 2,719,621 | 10/55 | Clough | 192—87 |
| 2,979,176 | 4/61 | Voth | 192—87 |
| 3,017,006 | 1/62 | Dence et al. | 192—109 |

FOREIGN PATENTS

| 633,985 | 1/62 | Canada. |
| 522,088 | 8/53 | Belgium. |
| 564,638 | 10/44 | Great Britain. |

DAVID J. WILLIAMOWSKY, *Primary Examiner.*